United States Patent [19]

Toschi et al.

[11] Patent Number: 5,450,986

[45] Date of Patent: Sep. 19, 1995

[54] AUTOMATIC WEIGHING PLANT FOR DYES IN POWDER FORM

[75] Inventors: Fabrizio Toschi, Breganze; Massimo Meneghini, Vicenza, both of Italy

[73] Assignee: Color Service SRL, Vincenza, Italy

[21] Appl. No.: 129,175

[22] PCT Filed: Apr. 22, 1992

[86] PCT No.: PCT/EP92/02192

§ 371 Date: Oct. 7, 1993

§ 102(e) Date: Oct. 7, 1993

[87] PCT Pub. No.: WO93/06443

PCT Pub. Date: Jan. 4, 1993

[30] Foreign Application Priority Data

Sep. 24, 1991 [IT] Italy .................. VI91A0151

[51] Int. Cl.[6] .................................................. G01F 13/00
[52] U.S. Cl. ................................. 222/240; 222/342; 222/413
[58] Field of Search ............... 222/342, 345, 413, 333, 222/240; 198/670, 671

[56] References Cited

U.S. PATENT DOCUMENTS

| 465,526 | 12/1891 | Heyer ..................... 222/240 |
| 1,790,347 | 1/1931 | Hawkins ................. 366/165 |
| 1,931,088 | 10/1933 | Schwarz et al. ........ 222/240 |
| 2,753,089 | 7/1956 | Phillips ................... 222/413 X |
| 3,033,249 | 5/1962 | Tamm ..................... 222/413 X |
| 3,058,628 | 10/1962 | Smith ..................... 222/342 X |
| 3,373,901 | 3/1968 | Pfeuffer ................. 222/240 X |
| 4,793,511 | 12/1988 | Ankum et al. ........ 222/342 X |
| 5,007,564 | 4/1991 | Beth et al. ............. 222/342 X |

FOREIGN PATENT DOCUMENTS

| 22090 | 1/1981 | European Pat. Off. . |
| 287708 | 10/1988 | European Pat. Off. . |
| 406164 | 1/1991 | European Pat. Off. . |
| 21942 | 9/1961 | Germany ............... 222/240 |
| 241299 | 12/1986 | Germany ............... 222/240 |

*Primary Examiner*—Andres Kashnikow
*Assistant Examiner*—Lisa Douglas
*Attorney, Agent, or Firm*—Watson, Cole, Grindle & Watson

[57] ABSTRACT

A powder dye extraction apparatus has an extraction screw with a hollow shaft which receives a push rod. A dye discharge door in the form of a perforated plate is mounted on the end of the screw and delivers powdered dye as the screw is rotated. A scraper is mounted externally of the aperture plate and rotates with the screw to pulverize the powdered dye as it is discharged. An end of the push rod extends out of the screw and carries a lid which is retractable over the aperture plate and scraper.

9 Claims, 4 Drawing Sheets

AUTOMATIC WEIGHING PLANT FOR DYES IN POWDER FORM

BACKGROUND OF THE INVENTION

The invention concerns the realization of an improvement in the extraction groups for dyes in powder form in automatic weighing plants.

SUMMARY OF THE INVENTION

It is known that the preparation of dye works mixtures for obtaining a specific color starting from the basic colors can be realized by means of dosing and weighing plants operating in automatic mode.

For example, an automatic dosing and weighing plant for the preparation of dye works mixtures is known, which is the object of the Italian patent n. 1210567, by the same inventor. It consists of a plurality of hoppers containing the dyes, placed side by side, each being provided with a dye extraction group. Each extraction group consists of an extraction screw placed inside the hopper, in front of which there is a discharge door provided with a perforated surface through which the dye in powder form comes out after being conveyed by the screw rotation. The dye which flows out of the discharge door is collected in a container placed on a scale which automatically stops the screw when the preselected weight is reached and then places the container under another extraction group which is a part of a container with a different dye.

A limit presented by this kind of dosing plants is the low weighing precision, which in general cannot be better than ±1/10 gram, even if the extraction of the dye from the discharge door is obtained by running the extraction screw at a low speed.

This low precision is due to the fact that when the dye comes out of the perforated surface of the discharge door, it is not in powdery form, but is clotted in grains of different sizes, thus allowing neither a homogeneous dosing nor a high weighing precision. Moreover, the realization of a low extraction speed in order to obtain enough precise weighings, namely within the tolerance value of plus or minus one tenth of gram, is expensive when large amounts of dye are to be weighed, because that causes an increase in the preparation time.

The purpose of the present invention is to overcome the above mentioned disadvantages by realizing an improvement in the extraction groups for dyes in powder form in automatic weighing plants, the main purpose of which being a significantly higher weighing accuracy.

Another purpose of the invention is to obtain a high weighing precision even with high extraction speeds and thus with high screw rotation speeds.

The above mentioned purposes are reached by the realization of an improvement in the extraction groups for dyes in powder form in automatic weighing plants, each extraction group comprising:

at least an extraction screw, placed inside a hopper for dye holding and externally wrapping a hollow shaft projecting from one side of the hopper and provided, at the protruding end, with a clutch for the connection to a screw rotation unit;

a dye discharge door, placed in the front part of the screw and applied to the dye holding hopper, provided with a perforated surface through which the dye in powder form comes out, after being conveyed by the rotation of the screw;

a lid for closing the dye discharge door, placed in front of the perforated surface of the door and connected with the end of a rod placed inside and passing through the hollow shaft of the screw from which the rod protrudes, coaxial, in correspondence of the clutch of the hollow shaft itself, said improvement being characterized in that it consists of a scraping element which adheres to the perforated surface of the discharge door and which is placed between the discharge door and the lid, said scraping element realizing the fine pulverization of the dye coming out of the door by sliding against the perforated surface of the door itself, said sliding being caused by the relative motion between said scraping element and said perforated surface of said discharge door.

Advantageously, the scraping element of the invention allows a high extraction speed, with a significantly higher weighing precision than that obtainable with similar plants without the scraping element of the invention.

Advantageously, the scraping element of the invention permits, with only one screw having a high capacity, the dosing of large amounts of dye in a short time, realizing weighings with a significantly higher tolerance than that obtainable with similar plants without the scraping element.

BRIEF DESCRIPTION OF THE DRAWINGS

The above mentioned purposes and advantages will be better understood from the description of a preferred form of execution of the invention, which is only given by way of illustration, but is not meant to limit the scope of the invention, such as it is illustrated in the alleged tables of drawings, wherein:

FIG. 1 shows the bottom part of an automatic weighing plant, with a full view of the extraction group which the improvement of the invention is applied to;

DESCRIPTION OF THE INVENTION

Figure 1:
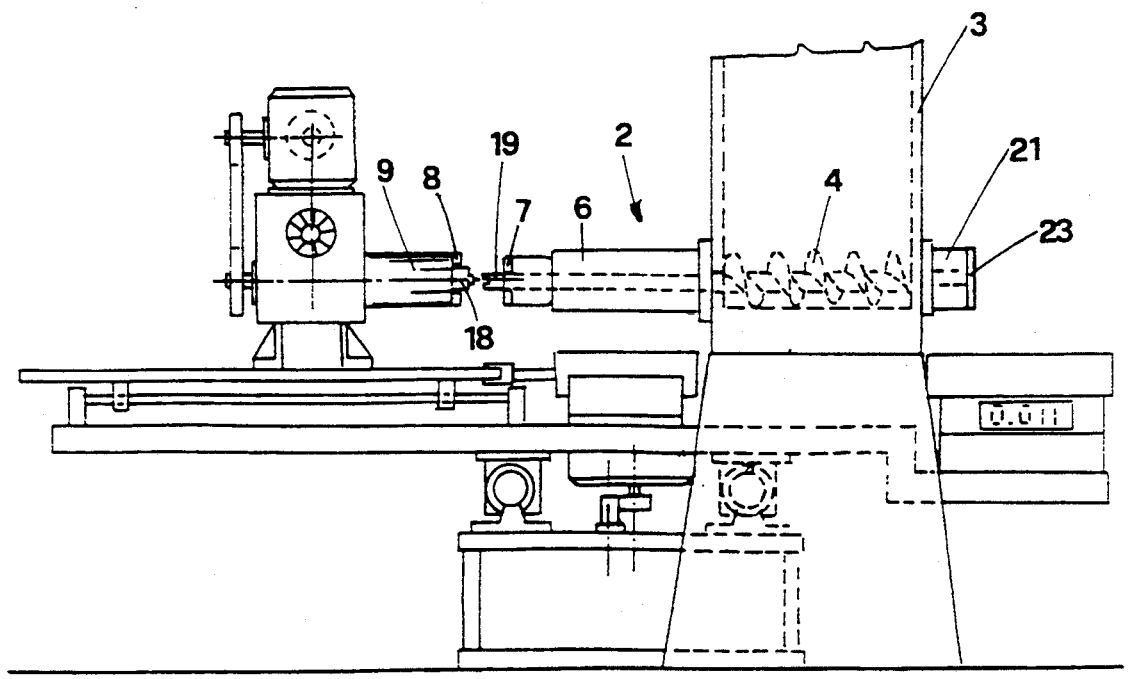
Figure 2:
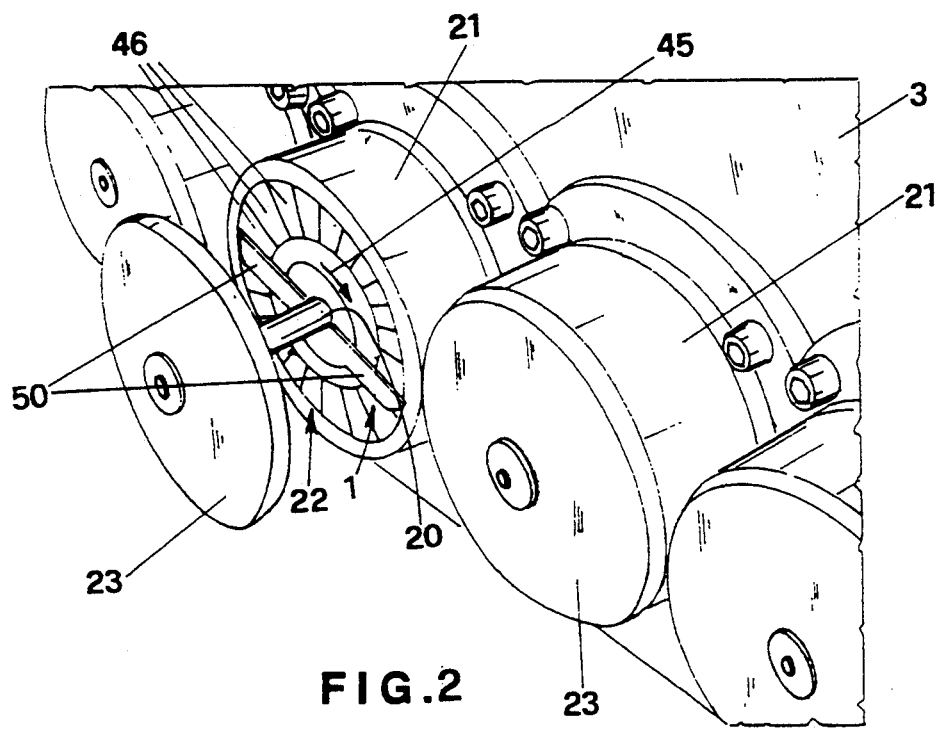
FIG. 2 shows in detail one of the discharge doors of the extraction group represented in FIG. 1, with the lid open, and provided with the scraping element of the invention.

As can be observed in FIG. 2, the improvement of the invention consists of a scraping element, indicated as a whole with 1, applied to the discharge door 21 of an extraction group, indicated as a whole with 2 and shown in FIG. 1. The extraction group 2 is placed in the bottom part of an automatic weighing plant for dyes in powder form, of which the FIG. 1 shows one of the hoppers 3, inside which the dye to be extracted is placed.

Figure 3:
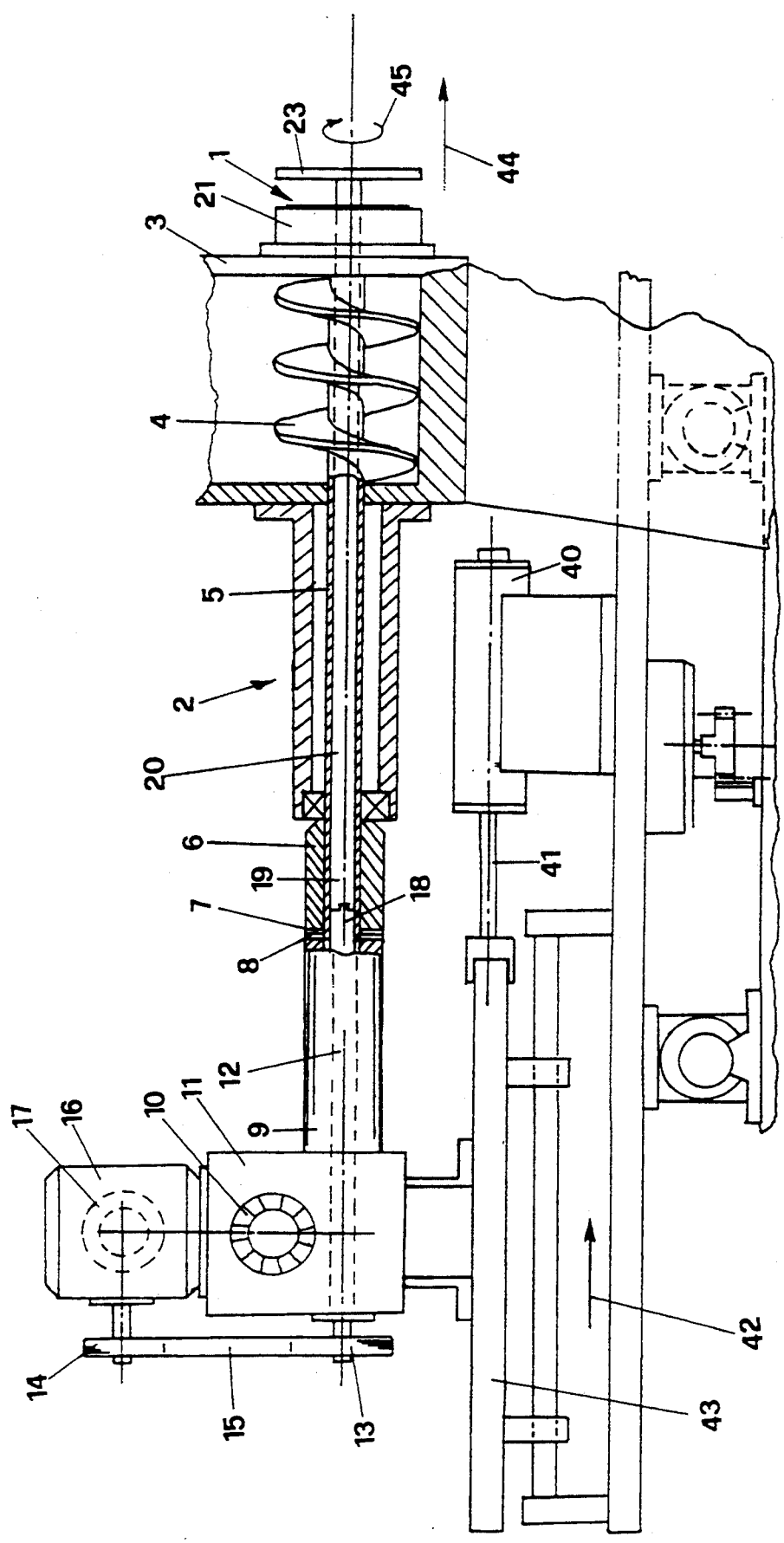
FIG. 3 shows a partial longitudinal section of the extraction group of FIG. 1.
Figure 4:
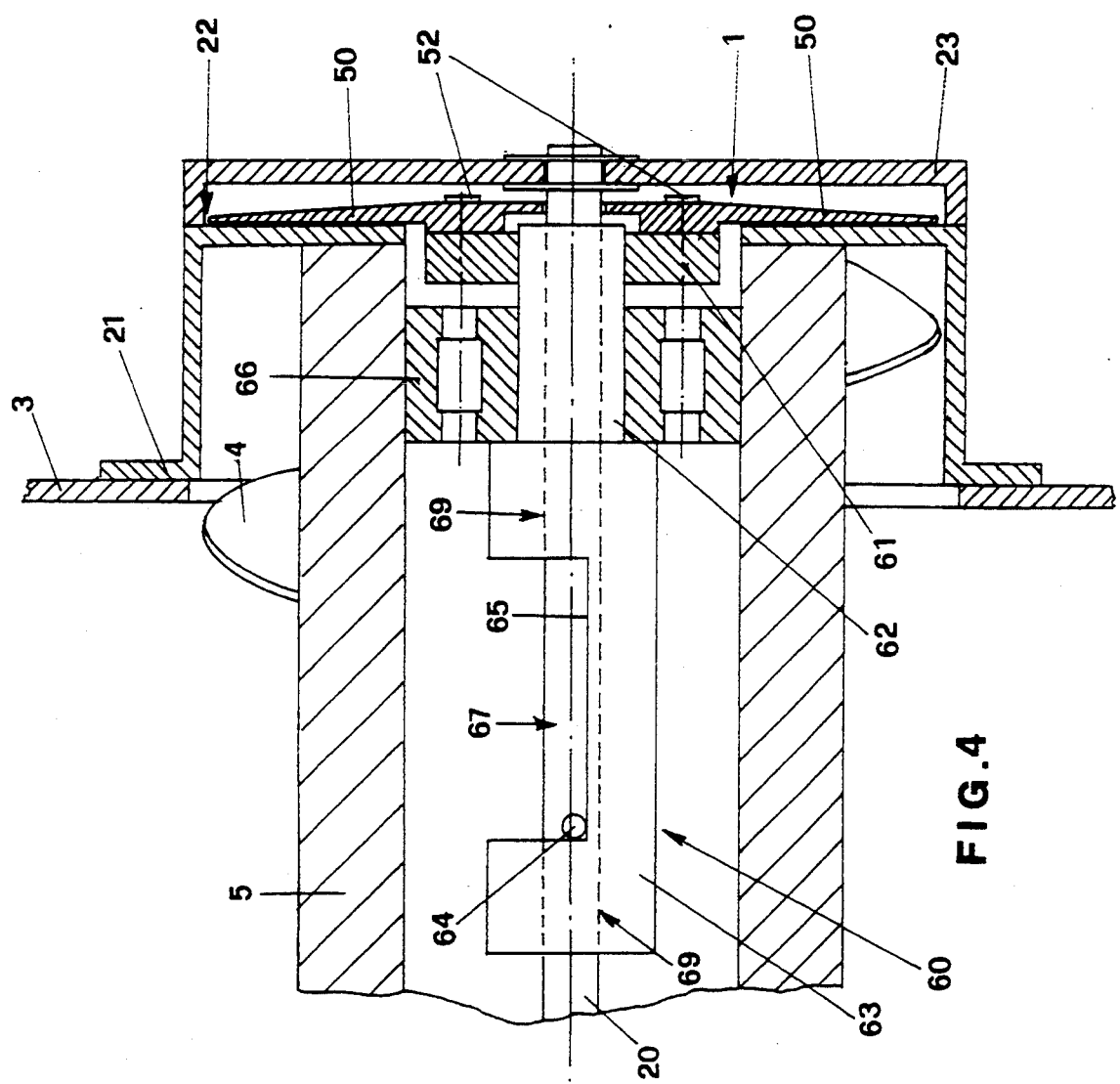
FIG. 4 shows in detail a longitudinal section of a dye discharge door in closed position, whereby the coupling of the scraping element with the passing through rod can be observed, by which it is made to rotate.

The above mentioned FIG. 1 and in greater detail the FIG. 3, show that the extraction group 2 consists of an extraction screw 4 placed inside the hopper 3 and externally wrapping a hollow shaft 5 protruding from one side of the hopper 3 itself. Said hollow shaft 5 is provided at one end with a clutch 6 provided with clutching cogs 7 through which the clutch is connected with the corresponding clutching cogs 8 belonging to the shaft 9, which is made to rotate by a motor 10 through a reduction gear unit 11.

A pin 12 is placed coaxial to the shaft 9, the former passing inside the shaft 9 in its full length and being keyed on a pulley 13 which, by means of a belt 15 and another pulley 14, is moved by another reduction gear unit 16, which is made to rotate by means of a motor 17.

The pin 12 presents in its end which is opposite to the pulley 13 an attaching gear 18 which engages into the end 19 of a rod 20 coaxially placed inside the hollow shaft 5 and passing through it in its full length.

In the front part of the screw, more precisely at the opposite part of the clutch 6 of the hollow shaft 5, there is a discharge door 21, which is applied to the hopper 3 and which has a perforated surface 22 through which the dye in powder form comes out, after being conveyed by the rotation of the screw 4, as shown in greater detail in FIG. 2. Also the discharge door 21 is axially crossed in its full length by the rod 20, which presents at the end a lid 23 connected to it.

Figure 6:
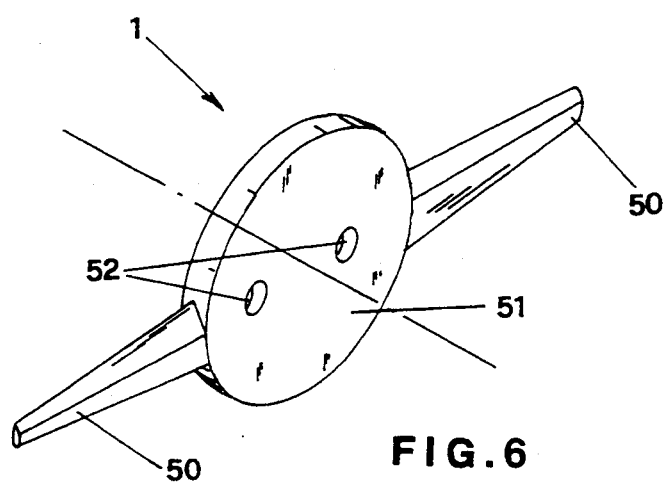
FIG. 6 shows the detail of the scraping element.

In front of the discharge door 21 and between the discharge door itself and the lid 23, there is the above mentioned scraping element 1 which, as shown in FIG. 6, consists of a couple of wings 50 lined up one another and radially placed at the periphery of a disc 51 of which the wings are part. The scraping element 1 has a disc 51 fixed to a flange 61 by means of screws 52, the flange itself being fixed to a pin 62 which forms the terminal part of a clutch 63, which constitutes the joint 60 for coupling the scraper 1 to the rod 20.

By means of the coupling joint 60, the scraper 1 realizes a sliding keying with the rod 20, which can axially run inside an axial hole 69 passing through the coupling joint 60. Moreover, when the rod 20 is made to rotate, it drags in rotation the joint 60 and also the scraper 1, due to the contrast of the pin 64, fixed to it and passing through, with the flat surface 65 of the clutch 63. As can be observed, the clutch 63 is a cylindrical perforated body provided with the hollow 67 in its middle part, realized preferably by milling, which involves a part of its axial hole 69 inside which the rod 20 slides, said clutch realizing at the bottom the contrast plane 65 against which the pin 64 acts. Moreover, as the pin 62 is fixedly keyed to the bearing 66 which in turn is fixedly keyed inside the hollow shaft 5 of the screw 4, the scraper 1 is also in a stable position with respect to the perforated surface 22 and to the discharge door 21.

Figure 5:
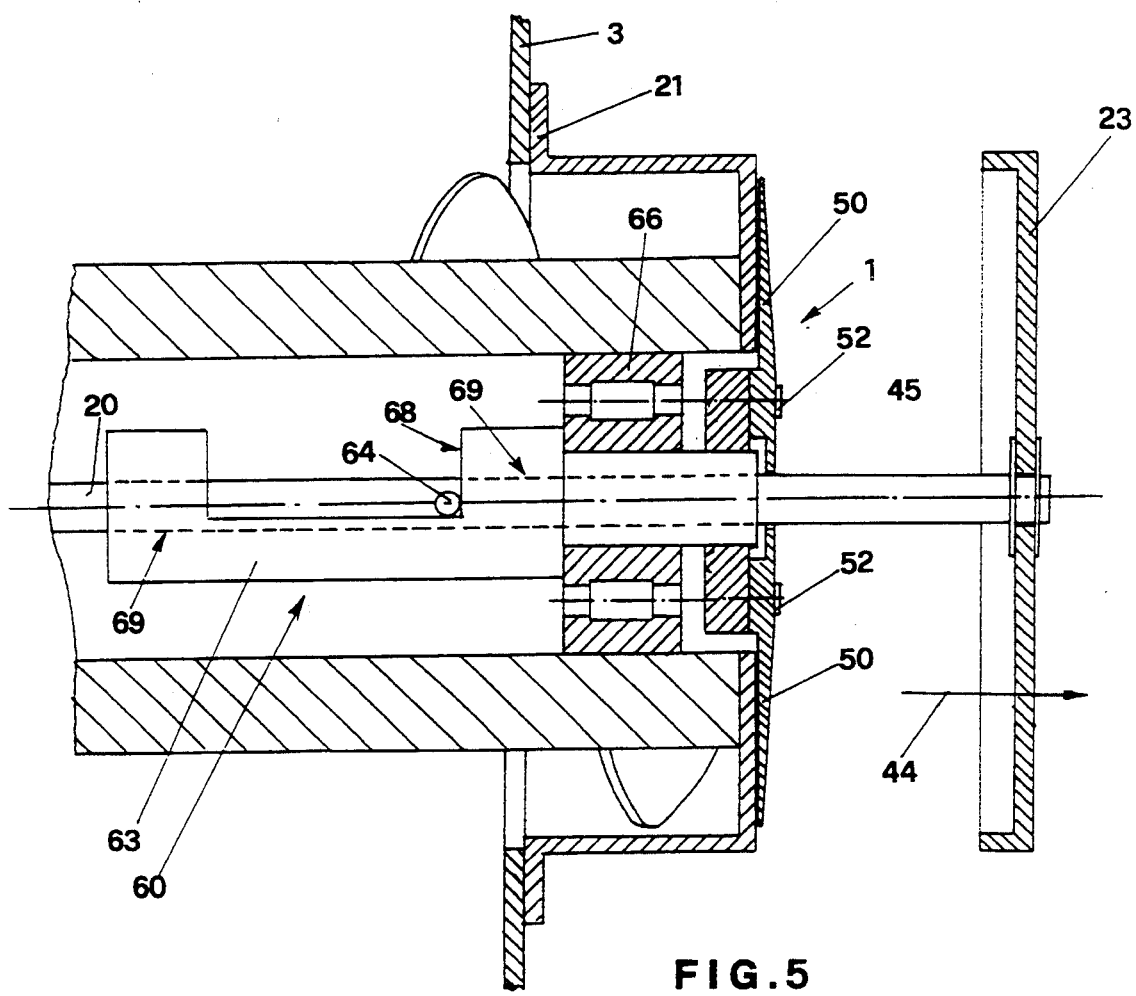
FIG. 5 shows the detail in FIG. 4, with the dye discharge door open.

The scraping element 1 operates when the extraction group 2 is operating. This happens when the actuator 40 is operated so that its stem 41, by withdrawing in the direction indicated by the arrow 42, moves the slide 43 in the same direction which supports the reduction gear units 11 and 16 and the motors 10 and 17 for the rotation of the screw 4 and of the rod 20. In this way, the attaching gear 18 of the pin 12 engages with the end 19 of the rod 20, thus causing the removal of the lid 23 from the door 21 according to the direction 44 shown in FIG. 3 and FIG. 5. At the same time, the rod 20 is made to rotate according to the direction indicated by the arrow 45, and this in turn causes the rotation of the scraping element 1 which, as said before, is keyed to the rod by means of the coupling joint 60. The contrast of the pin 64 against the wall 68, as shown in FIG. 5, stops the axial stroke of the rod 20, thus limiting the opening of the lid 23.

Subsequently, when the clutching cogs 8 of the shaft 9 are in contact with the corresponding cogs 7 of the clutch 6, also the screw 4 is made to rotate, causing the outflow of the dye through the holes 46 of the discharge door 21. During the outflow of the dye the scraping element 1, rotating adherently to the perforated surface 22 of the discharge door 21, with the sliding effect causes a mechanical action which realizes the fine pulverization of the outcoming dye, breaking up the clots. A continuous flux of powdery material outflows then from the discharge door 21, allowing a more accurate weighing.

Experimental tests have shown that, by applying the scraping element of the invention, the same plant operating with identical dyes allows the realization of weighings with a precision of plus or minus 1/100 of gram, with respect to the previous precision of plus or minus 1/10 of gram. By using more precise and draught protected scales, this precision can be increased up to a milligram.

Moreover, the application of such scraping element allows the shorting of the preparation time of the mixtures. In fact, in the weighing plants without the scraping element, the screw speed is decreased when reaching the preselected weight, in order to avoid that, in the final phase, the accidental drop of too much dye causes poor precision weighings. By applying the scraping element of the invention instead, the dye drop is kept under control and thus the screw can rotate at a higher speed even when reaching the preselected weight.

It is understood then, according to what has been said, that the improvement of the invention reaches all the desired aims.

The scraping element of the invention, which consists, as said before, of a couple of wings 50 lined-up with one another, could also have a different form, because the wings can be other than two and disposed otherwise.

Said scraping element can be also arranged on the perforated surface of the discharge door in a manner different from the above mentioned one, it being understood that, however, the pulverizing action it realizes must always be made by the relative sliding between the scraping element and the perforated surface of the discharge door itself.

In a different realization, the scraping element could also stay fixed and the pulverizing effect of the outcoming dye could be realized by the sliding due to the rotation of the discharge door.

It is understood, however, that all said variations and modifications do not exceed the scope of the present invention.

We claim:

1. An extraction apparatus for dyes in powder form in automatic dosing plants, comprising:

a dye holding hopper;

at least one extraction screw mounted in the dye holding hopper for conveying the dyes therethrough, and having a hollow shaft, said at least one extraction screw having a protruding end extending from the hopper and a clutch at the protruding end for connection to a rotatable drive therefor;

a dye discharge door secured to the dye holding hopper, a front portion of the at least one extraction screw located in the dye discharge door, said dye discharge door having a perforated surface through which the dye in powder form is discharged after being conveyed by the rotation of the at least one extraction screw;

a rod having an end and extending inside the hollow shaft coaxial with the clutch;

a lid for closing the dye discharge door, located in front of the perforated surface thereof and connected to the end of the rod; and a scraping element disposed adjacent to the perforated surface between the dye discharge door and the lid, said scraping element for pulverizing the dye discharged from the dye discharge door by sliding against the perforated surface thereof resulting from relative motion between said scraping element and said perforated surface of said dye discharge door.

2. An extraction apparatus according to claim 1 wherein the scraping element is slidably keyed, by means of a coupling joint, to the rod, which is coaxial to the hollow shaft, and which is rotatable with the rotation of said rod through the said coupling joint.

3. An extraction apparatus according to claim 2 wherein the coupling joint comprises a clutch having an axial hole in which the rod is located, said rod having an end pin for engaging the clutch inside the hollow shaft, a bearing interposed between the end of the rod and the hollow shaft for supporting the clutch therein, said clutch including a radial pin secured to the rod and having a hollow in its middle part, which includes a portion of the axial hole, a bottom surface of said hollow being a plane which contacts against the radial pin for thereby transmitting the rotation of said rod to the clutch by contact against the plane of the bottom surface of the hollow.

4. An extraction apparatus according to claim 3 wherein the scraping element comprises a pair of wings lined-up with one another and radially fixed to the periphery of a disc, said disc being fixed by means of screws coaxial to a flange, which in turn is fixed to the pin of the coupling joint.

5. An apparatus for extracting dyes in powder form comprising a dye hopper for receiving powdered dyes therein;

an extraction screw having an axial bore therein located in the dye hopper, said screw having a driving end and a dye delivery end;

a drive for engaging the screw and a clutch for coupling the drive with the driving end of the screw;

a dye discharge door located on the dye delivery end of the screw having a perforated discharge surface, said dye being discharged through the perforated surface by rotation of the screw;

a lid for closing the discharge door located in front of the perforated surface;

a rod located in the bore within the screw having one end coupled to the discharge door and having an opposite end for engaging the clutch;

a scraping element slidably mounted on the rod and located between the lid and the perforated surface, said scraping element for pulverizing dye discharged from the door by sliding thereagainst with rotation of the screw.

6. An extraction apparatus according to claim 5 wherein the scraping element is slidably keyed onto the rod and the lid is mounted on the rod for axial motion relative to the door and the scraping element such that the scraping element is rotatable with the screw and the lid is axially movable relative to the perforated surface and the scraping element.

7. An extraction apparatus according to claim 5 further including means for coupling the lid with the screw including a slidable joint therebetween.

8. An extraction apparatus according to claim 7 wherein the slidable joint comprises a sleeve having an elongated axial recess, said sleeve slidably mounted on the rod, and a pin attached to the rod having a free end located in the axial recess of the sleeve.

9. An extraction apparatus for dyes in powder form in automatic dosing plants, comprising:

a dye holding hopper;

an extraction screw operatively coupled to the hopper;

a drive for rotatably driving the extraction screw;

the extraction screw including a hollow shaft located inside the dye holding hopper, and a protruding end extending from the hopper;

a clutch at the protruding end for connection to the drive;

a dye discharge door secured to the hopper, a front portion of the extraction screw located in the dye discharge door, said dye discharge door having a perforated surface;

a lid located in front of the perforated surface for closing the dye discharge door;

a rod having a protruding end, passing inside the hollow shaft coaxially with the clutch said lid connected to the protruding end of said rod;

a rotatable scraping element disposed adjacent to the perforated surface between the dye discharge door and the lid, said scraping element for slidably engaging the perforated surface resulting from relative motion between said scraping element and said perforated surface; and a coupling joint, slidably keyed to the rod and being coaxial with the hollow shaft for slidably connecting the rod to the hollow shaft for rotation therewith.

* * * * *